Feb. 7, 1928. 1,658,430
F. V. DONALD
TRACTOR HITCH FOR LAWN MOWERS
Filed Jan. 30, 1922 2 Sheets-Sheet 2
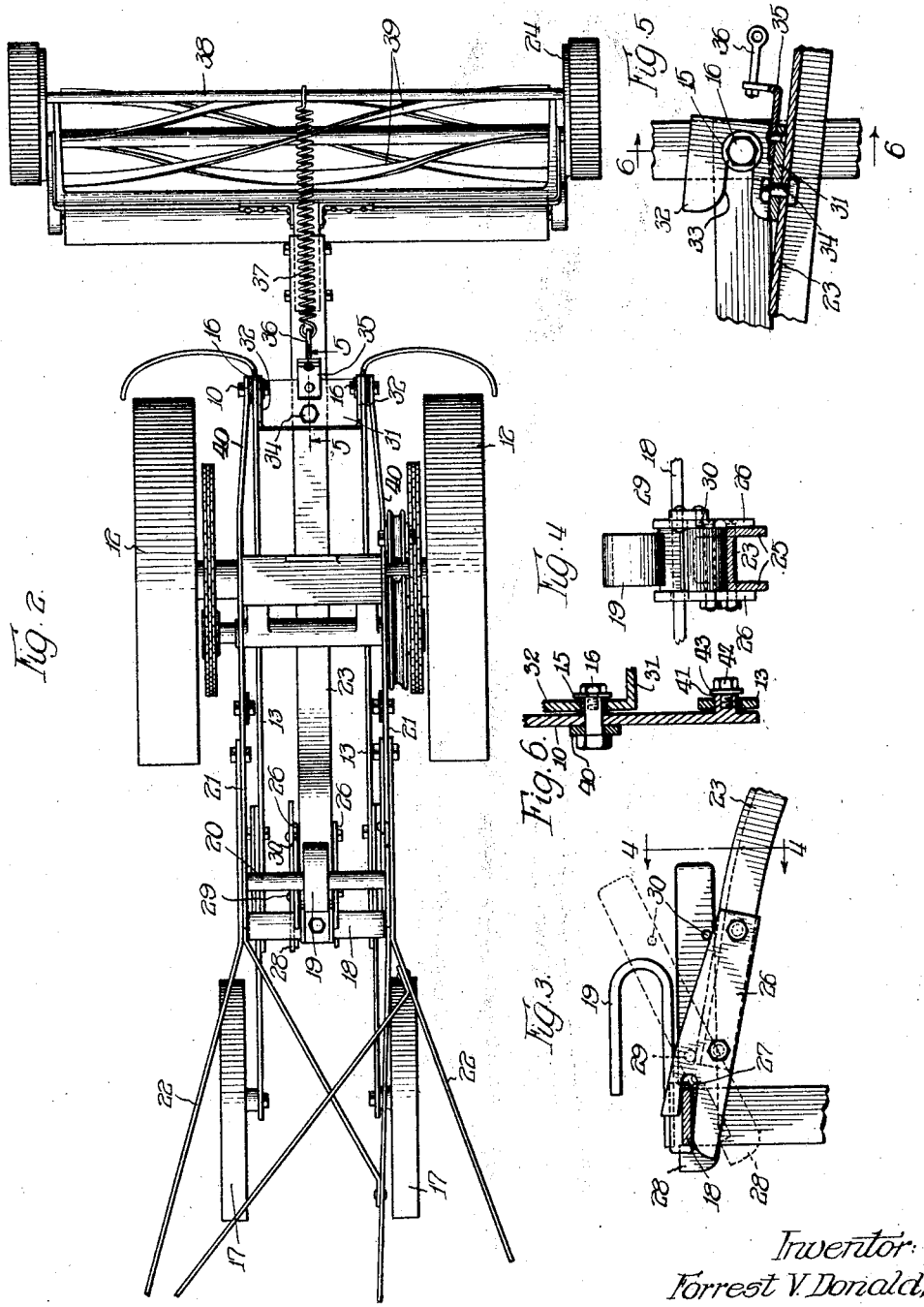
Inventor:
Forrest V. Donald, Patented Feb. 7, 1928.

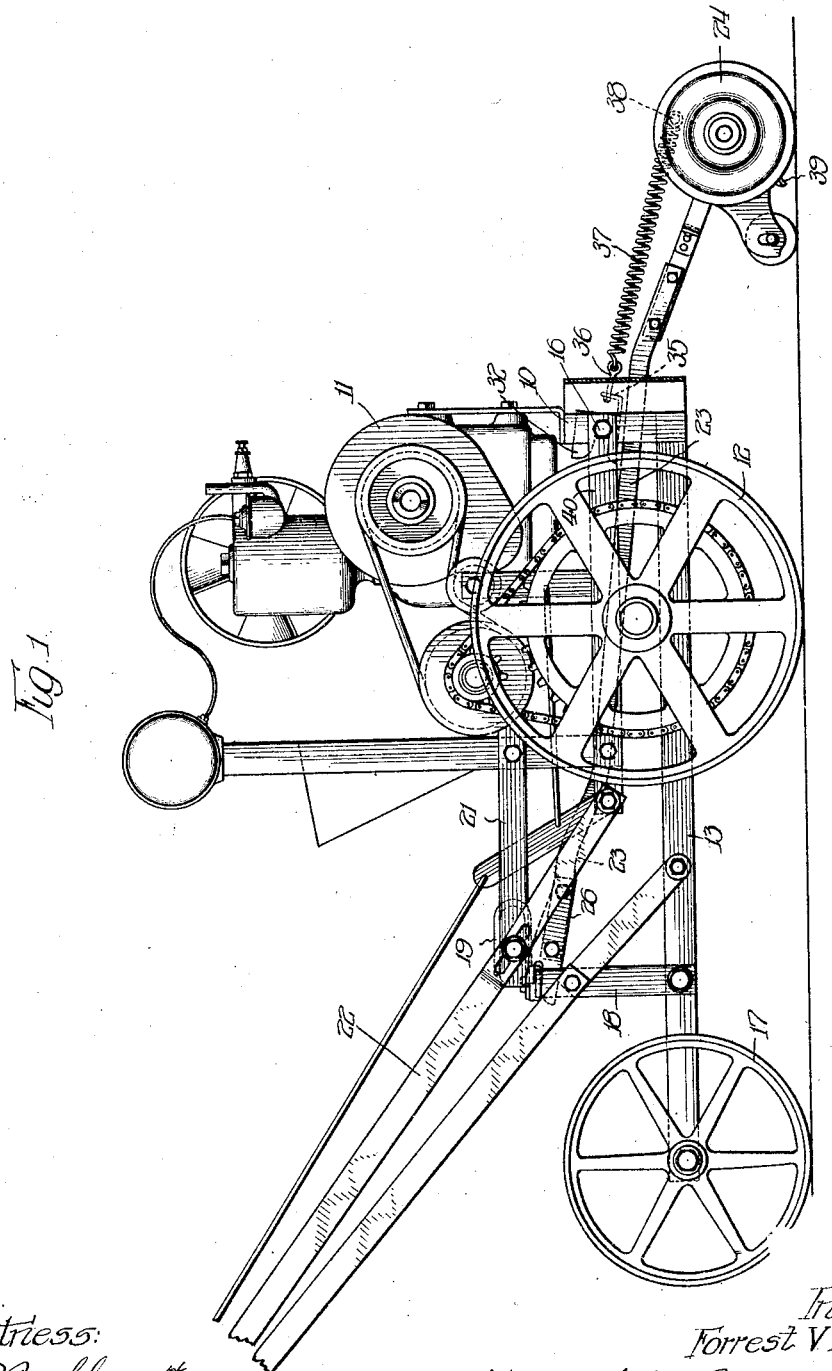

1,658,430

UNITED STATES PATENT OFFICE.

FORREST V. DONALD, OF PORT WASHINGTON, WISCONSIN, ASSIGNOR TO GILSON MANUFACTURING COMPANY, OF PORT WASHINGTON, WISCONSIN, A CORPORATION OF WISCONSIN.

TRACTOR HITCH FOR LAWN MOWERS.

Application filed January 30, 1922. Serial No. 532,706.

This invention relates to a tractor hitch for lawn mowers.

One object of the invention is to provide a simple, durable and reliable tractor hitch for lawn mowers whereby a lawn mower may be quickly and easily attached to and detached from a tractor.

Another object is to provide an instant tractor hitch for lawn mowers wherein the parts are arranged to cooperate in a manner to meet all the requirements for successful commercial use.

These and other objects are accomplished by means of the arrangement disclosed on the accompanying sheets of drawings, in which—

Figure 1 is a fragmentary side elevation of a tractor and lawn mower connected by my improved hitch;

Figure 2 is a top plan view of the same arrangement;

Figure 3 is an enlarged fragmentary side elevation, parts being in section, of the rear of the hitch push bar showing the manner in which it is connected to a part of the tractor structure;

Figure 4 is a fragmentary detail view taken in the plane of line 4—4 of Figure 3;

Figure 5 is a detail sectional view taken in the plane of line 5—5 of Figure 2; and Figure 6 is a detail sectional view taken in the plane of the line 6—6 of Figure 5.

The various novel features of my invention will be apparent from the following description and drawings, and will be particularly pointed out in the appended claims.

Referring to the figures of the drawings, it will be noted that I have disclosed my invention in connection with a tractor having a main frame 10 supporting a propelling engine 11 and carried by traction wheels 12, there being in this particular instance bars 13 which normally carry ground working tools, which bars are flexibly connected to inwardly extending projections 41 (see Figure 6) at the front end of the tractor frame 10, said bars 13 being retained on said projections 41 by a washer 43 and stud bolts 42. The rear end of the bars 13 are supported by ground engaging wheels 17. Connecting the bars 13 transversely for maintaining same a predetermined distance apart is an arch bar 18. Secured to the horizontal portion of the arch bar 18 at the middle thereof is a loop-shaped member 19 which extends forwardly therefrom and guidably receives a cross-piece 20 connecting longitudinally extending bars 21 of the tractor main frame and also transversely connecting rearwardly extending handle bars 22 by means of which the tractor is steered and turned. In view of the fact that the bars 13 are connected to the main frame of the tractor in advance of the points where the traction wheels 12 engage the ground, said trailing tool bars 13 turn simultaneously in the same sense as the tractor frame, that is to say, if the tractor is turned to the right the tool bars 13 immediately follow to the right, and if the main tractor frame is moved to the left the tools 13 immediately follow to the left.

The tractor hitch to be described is particularly adapted for use in connection with this tractor but it is to be understood that it may be used with other types of tractors.

The mower tractor hitch includes a hitch push bar 23 which extends longitudinally and centrally with respect to the tractor and has secured at its front end any suitable lawn mower proper 24. The push bar 23, as shown, is in the form of a channel member and at the rear thereof has secured to the flanges 25 thereof, stationary jaw members 26 each having an opening 27 for the reception of the cross-piece of the arch bar 18 or any other suitable part of the tractor structure. These jaw members 26 open rearwardly so that upon forward movement of the tractor the lawn mower is pushed in advance thereof without any tendency for the hitch bar 23 being disconnected from the arch bar 18. However, to lock the hitch bar 23 in operative position and to prevent its being accidentally disconnected upon the backing of the tractor, one or both of the stationary jaw members is provided with a pivotally mounted associated jaw member 28 which, in this instance, closes around under the arch bar 18, firmly holding the tractor hitch member 23 in fixed position with respect to said arch bar 18.

In the arrangement shown but a single movable jaw member 28 is provided, such being pivotally connected to one of the stationary jaw members at 29. Said movable jaw member 28 is provided with a projection 30 for engaging its associated stationary jaw member 26 for limiting the movement of the movable jaw member to prevent its going beyond a locking position when the hitch is not applied to the tractor. The stationary jaw members 26 are arranged on opposite sides of the loop-shaped member 19.

Near the forward end of the push bar 23 there is provided a cross-piece 31 at the outer ends of which are provided upstanding ears 32 having longitudinally extending slots 33 open at their rear ends for the reception of the inwardly extending bolts 16 at the front of the tractor. The ears 32 fit between the washers 15 and members 10 as clearly shown in Figure 6. The bolts 16 secure the upper fixed frame members 40 to the frame 10. In this way the lawn mower, at all times, is held in proper alinement with respect to the tractor and accordingly responds quickly to any steering or turning movement of the tractor. The cross-piece 31 may be secured to the push bar 23 in any suitable manner, such as by bolts 34. Secured to the cross-member 31 is a bracket 35 to which is connected an I-bolt 36 for receiving the rear end of a coiled spring 37, the front end of which is connected to a cross-piece 38 on the mower proper for holding the cutting mechanism 39 of the mower down in proper relative position with respect to the lawn to be cut.

By means of this tractor hitch, the mower may be instantly attached to and detached from the tractor, it merely being necessary to move the ears 32 into position to receive the projections 14 and at the same time move the stationary jaws into operative association with the arch bar 18 and then pivot the movable locking jaw 28. To release the mower from the tractor, it is merely necessary to swing the locking jaw 28 in an opposite direction and move the mower forwardly.

It is my intention to cover all modifications of the invention falling within the spirit and scope of the following claims.

I claim:

1. In a tractor hitch for lawn mowers, the combination of a push bar to which a lawn mower is connected, means on one end of the bar to connect it to the tractor structure, and a transversely extending member secured to the push bar having slotted ears for the reception of portions of the tractor frame whereby the mower may be held in proper alignment.

2. In a quick detachable tractor hitch for lawn mowers, the combination of a single longitudinally extending push bar to which a lawn mower is connected, a latch on the rear end of the bar to connect it to the tractor structure, and laterally extended hook means permanently secured to an intermediate portion of the bar and adapted to hook over a portion of the tractor structure to hold the mower in proper alignment.

3. In a tractor hitch for lawn mowers, the combination of a push bar to which the lawn mower is connected, a jaw member at the rear end of the push bar for receiving a part of the tractor structure, a pivotally mounted jaw member cooperating with the other jaw member for locking the push bar to the tractor, a transversely extending member secured to said push bar having slotted ears for the reception of portions of the tractor frame whereby the mower may be held in proper alinement.

4. In a tractor hitch for lawn mowers, the combination of a push bar to which the lawn mower is connected, a jaw member at the rear end of the push bar for receiving a part of the tractor structure, a pivotally mounted jaw member cooperating with the other jaw member for locking the push bar to the tractor, a transversely extending member secured to said push bar having slotted ears for the reception of portions of the tractor frame whereby the mower may be held in proper alinement, and a bracket secured to said transverse member to which a spring may be attached for holding the cutting mechanism of the mower in proper position with respect to the ground.

5. In combination, a tractor having a main frame, bars for carrying tools connected to said frame, a transverse member for connecting said bars, a push bar of a tractor hitch to which a lawn mower is connected, a jaw member on said push bar at the rear thereof for receiving said transverse member, and means carried by said bar and positively engageable with a part of the tractor structure and fixedly engaging said structure for holding the mower in proper alinement.

Signed at Chicago, Illinois, this 24th day of January, 1922.

FORREST V. DONALD.